United States Patent
Kano

(10) Patent No.: US 7,519,597 B2
(45) Date of Patent: Apr. 14, 2009

(54) DEVICE AND METHOD FOR MANAGING FILES IN STORAGE DEVICE

(75) Inventor: Takahiro Kano, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 253 days.

(21) Appl. No.: 11/019,049

(22) Filed: Dec. 22, 2004

(65) Prior Publication Data

US 2006/0095433 A1 May 4, 2006

(30) Foreign Application Priority Data

Oct. 29, 2004 (JP) .............................. 2004-316229

(51) Int. Cl.
G06F 17/00 (2006.01)
G06F 17/30 (2006.01)
(52) U.S. Cl. ............... 707/9; 707/8; 707/10; 707/104.1
(58) Field of Classification Search ..................... 707/1, 707/8, 9, 10, 104.1
See application file for complete search history.

(56) References Cited

U.S. PATENT DOCUMENTS

| | | | | |
|---|---|---|---|---|
| 6,182,142 B1 * | 1/2001 | Win et al. | .................... | 709/229 |
| 6,275,825 B1 * | 8/2001 | Kobayashi et al. | ............. | 707/9 |
| 6,668,322 B1 * | 12/2003 | Wood et al. | ................. | 713/182 |
| 7,146,499 B2 * | 12/2006 | Yellepeddy | ................. | 713/165 |
| 7,150,041 B2 * | 12/2006 | Kishimoto et al. | ............ | 726/12 |
| 7,210,043 B2 | 4/2007 | Miyazaki et al. | | |
| 2001/0044840 A1 * | 11/2001 | Carleton | ...................... | 709/223 |
| 2003/0072031 A1 * | 4/2003 | Kuwata et al. | ............. | 358/1.15 |
| 2004/0010714 A1 * | 1/2004 | Stewart | ...................... | 713/201 |
| 2004/0205152 A1 * | 10/2004 | Yasuda et al. | ............... | 709/217 |
| 2005/0033850 A1 * | 2/2005 | Kirkland | ..................... | 709/228 |

FOREIGN PATENT DOCUMENTS

| | | |
|---|---|---|
| JP | 11-045034 | 2/1999 |
| JP | 2000-235642 | 8/2000 |
| JP | 2002-135867 | 5/2002 |
| JP | 2002-244695 | 8/2002 |
| JP | 2002-318719 | 10/2002 |
| JP | 2004-303051 | 10/2004 |

* cited by examiner

*Primary Examiner*—Don Wong
*Assistant Examiner*—Thanh-Ha Dang
(74) *Attorney, Agent, or Firm*—Buchanan Ingersoll & Rooney PC

(57) ABSTRACT

In a device, files are stored in each of a plurality of storage areas, and an authenticated user can browse and/or manipulate the files stored in the storage areas. A user is allowed to set the device when the user is authenticated as a system administrator, otherwise the user is inhibited to set the device. A user is allowed to browse and/or manipulate a storage area provided for the user in the plurality of storage areas in the storage device. The user is allowed to browse and/or manipulate another storage area when the user is a box administrator different from a system administrator, the another area being provided for another user authenticated and different from the box administrator. Alternatively, the user is inhibited to browse and/or manipulate files stored in a storage area provided for another user even when the user is the system administrator.

12 Claims, 7 Drawing Sheets

Fig. 8

| ID | BOX NAME | OWNER | |
|---|---|---|---|
| BOX1 | SHARED | PUBLIC | BOX JOB INFORMATION |
| BOX2 | YAMADA'S BOX | YAMADA | BOX JOB INFORMATION |

[ CREATE BOX ] [ DELETE BOX ] [ CHANGE BOX ]

Fig. 9

| ID | BOX NAME | OWNER | |
|---|---|---|---|
| BOX1 | SHARED | PUBLIC | BOX JOB INFORMATION |
| BOX2 | YAMADA'S BOX | YAMADA | |
| BOX3 | TANAKA'S BOX | TANAKA | |

[ CREATE BOX ] [ DELETE BOX ] [ CHANGE BOX ]

Fig. 10

BOX ID      1
BOX NAME    BOX1

| JOB ID | JOB NAME | CREATE TIME | |
|---|---|---|---|
| 00001 | REPORT | 200X/XX/XX | DELETE JOB |
| 00002 | SIGN_ON | 200X/XX/XX | DELETE JOB |
| 00003 | RECEIVE MAIL | 200X/XX/XX | DELETE JOB |

DEVICE AND METHOD FOR MANAGING FILES IN STORAGE DEVICE

This application is based on application No. 2004-316229 filed in Japan, the contents of which are hereby incorporated by reference.

BACKGROUND OF THE INVENTION

1. Field of the Invention

The present invention relates to file management of a device, such as a printing device, which stores a large number of files in partitioned storage areas.

2. Description of the Related Art

A device (a peripheral device) is connected via a network to external devices such as a computer (PC) and operated by the external devices. A hard disk drive serving as a mass storage device is provided in the device to store a large number of files (documents), and it is operated as a document management server. The hard disk drive is provided with partitioned specific storage areas, and each partitioned specific storage area is called a box. A user stores files into a box and can use the files stored in the box. The device is for example a multi-function peripheral having many functions of a printer, a scanner, a facsimile and the like, besides the above-mentioned document management server.

An administrator of a device manages the boxes maintained by users. The boxes include private boxes which are registered by setting a password for each user. A private box cannot be assessed without the user password. In order to facilitate the management of boxes, for example, in a system disclosed in JP-A 2000-235642, a private box can be automatically registered even when there exists no administrator.

Meanwhile, in these devices, not anyone can perform or change the device settings, and only a device administrator (also called as system administrator) can set or change the device setting. For example, the device setting for a MFP includes network setting, register of the destinations in abbreviation keys or compression keys, setting of default values such as image processing conditions or reading conditions. The system administrator can perform all the settings and modifications with respect to the devices to be managed and can also perform the file manipulation and box manipulation. For example, in JP-A 11-45034/1999, it is proposed that a system manager can delete image information even if the system manager is not a normal user.

SUMMARY OF THE INVENTION

An object of the invention is to provide the efficient box management for a device.

In a device according to the invention, files are stored in each of a plurality of storage areas, and an authenticated user can browse and/or manipulate the files stored in the storage areas. A user is allowed to set the device when the user is authenticated as a system administrator, while the user is inhibited to set the device when the user is not authenticated as the system administrator. A user is allowed to browse and/or manipulate a storage area provided for the user in the plurality of storage areas in the storage device. The user is allowed to browse and/or manipulate another storage area when the user is a box administrator different from a system administrator, the another area being provided for another user authenticated and different from the box administrator. Alternatively, the user is inhibited to browse and/or manipulate files stored in a storage area provided for another user even when the user is the system administrator.

It is an advantage of the invention that a user's request can be satisfied under various usage conditions by introducing a flexible management system which includes a box administrator in addition to a system administrator.

BRIEF DESCRIPTION OF THE DRAWINGS

These and other objects and features of the present invention will become clear from the following description taken in conjunction with the preferred embodiments thereof with reference to the accompanying drawings, and in which:

FIG. 8 is a user interface for a general user;

FIG. 9 is a user interface for a system administrator;

FIG. 10 is a diagram of a window showing the details of a box; and

DESCRIPTION OF THE PREFERRED EMBODIMENTS

Figure 1:
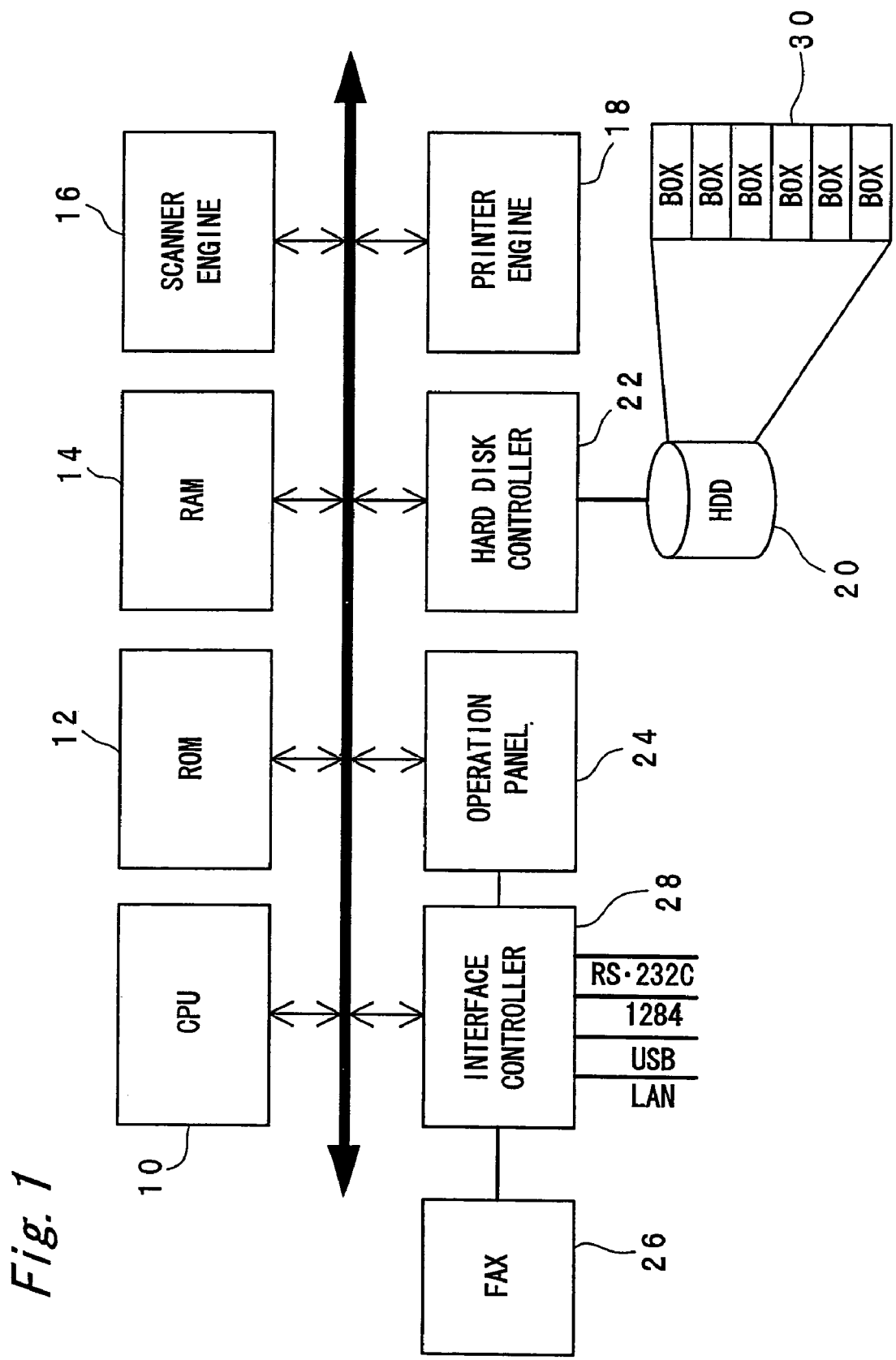
FIG. 1 is a block diagram of a multi-functional peripheral.

Referring now to the drawings, wherein like reference characters designate like or corresponding parts throughout the several views, FIG. 1 shows a configuration of a multi-functional peripheral (hereinafter referred to as MFP) as an example of an image processing device according to a first embodiment of the invention. The MFP is a network device which functions as a scanner, a printer, a copying machine and the like. The MFP includes a central processing unit (CPU) 10 which controls the entire device. The CPU 10 is connected to the following components: a read-only memory (ROM) 12 which stores programs and the like, a random access memory (RAM) 14 serving as a work area, a scanner engine 16 including a controller thereof, a printer engine 18 including a controller thereof, a hard disk controller 22 which controls a hard disk drive 20, an operation panel 24 to be operated by a user and to display various screen, a facsimile unit 26, and an interface controller 28 for sending/receiving various signals (or communicating with) to/from the external through the network. When a job is sent from an external computer to the MFP, it is stored as a document in a box 30 in the boxes provided in the hard disk drive 20. When the MFP works as a printer, an image is printed by the printer engine 18, while when the MFP works as a copying machine, an image read by the scanner engine 16 is printed by the printer engine 18. The operation panel 24 accepts various instructions and data by a user, and also displays various screens. Users of the external devices share the MFP through the network. The MFP can execute jobs registered from the external devices, jobs read by the scanner and other jobs.

A hard disk drive 20 serving as a mass storage device includes partitioned storage areas, and each of the partitioned areas is called a box 30. Jobs (document) sent from external devices to the image processing device can be stored in the boxes.

The boxes include a public box and a private box. A private box stores files of an individual or a department including a plurality of individuals. Only an individual or a department can manipulate or browse files in a private box owned thereby.

Data stored in a private box can not be accessed if the password and/or the user identification (ID) for the individual or for the individual belonging to the department for the box are not inputted. A box administrator secures a box (private box) in the storage device and issues a user ID for certifying a particular individual or a department which is allowed to access the box.

On the other hand, a public box stores files shared by a plurality of users. The box administrator secures a public box in the storage device and issues a user ID for certifying a user who can access the public box. Alternatively, the creation of a private box or a public box and the issuance of an ID can also be carried out by the user, instead of the box administrator. Alternatively, a public box may be manipulated by anyone irrespective of the ID.

Next, a device management system in the image processing device is explained. In a system in which documents are stored in the boxes, a large number of boxes are used personally or shared by users. In an MFP which has a function of book binding called Print_On_Demand, a print operator often manages the boxes and the printing job, apart from a system administrator. In this embodiment, in addition to the system administrator who manages the whole device, there is provided a box administrator who manages the boxes. The system administrator does not manage the boxes managed by the box administrator, while the box manager does not manages the device except the boxes. By introducing such a flexible management system, a user's request can be satisfied under various usage conditions. In addition, by segmenting the access authority, security of the system can be improved.

Next, device management in this embodiment is explained. Previously, if the system administrator, who manages the device also manages files stored in the boxes maintained by general users. Thus, the security in the system cannot be ensured. Meanwhile, the print performance of a device such as an MFP has been remarkably improved. Thus, by using a high-speed image processing device, even book binding becomes possible by use of Print_On_Demand. In order to use such a high-speed device, in the field of quick printing, a person who creates documents stores the documents in his/her own box, and when the documents are printed, an operator, called a print operator, specialized in printing performs the printing. In this case, in conventional box management, the access authority for the box must be given to both the general users or the document creators and the print operator; therefore, the setting of access authorities for all the boxes can be very troublesome. On the other hand, when a print operator is registered as the system administrator who can access all boxes, the system settings or modifications may be performed by the printing operator, even if unintentionally, thus causing a problem. Device management in this embodiment solves this problem, as will be explained below.

In the device management system of this embodiment, as shown in Table 1, the access authority is divided among general users, a box administrator and a system administrator. In Table 1, an open circle means that the operation is possible, a square means that the operation is possible in a limited case, and an x mark means the operation is not allowed. The access authority has been registered in an authentication device (a database) which performs user authentication. According to the user ID and/or password which a user uses when logging in the device, the user is given general user authority, box administrator authority or system administrator authority. In this case, a general user has the general user authority with which he/she can browse information such as device status information and at the same time can browse and manipulate jobs stored in his/her own private box or in the public box. The box administrator has the box administrator authority with which he or she can not only browse information and browse/manipulate jobs stored in his or her own private box and in the public box as one of the above-mentioned general users, but also browse/manipulates jobs stored in the private boxes. However, the authority for the device setting is not given to the box administrator. The system administrator has the system administrator authority with which he or she can not only browse information and browse/manipulate jobs stored in his or her own private box and in the public box as the above-mentioned general user, but also can perform the device setting. As shown in Table 1, the authority of browsing/manipulating jobs stored in other persons' private box is not given to the system administrator, thereby improving the security in the system.

According to the embodiment, in addition to the general user, there is provided a public user who has public user authority with which he can browse and manipulate jobs stored in the public box.

TABLE 1

| | Authorities of various users | | | | | |
|---|---|---|---|---|---|---|
| | Public box | | Private box | | | Device setting |
| | Browse/manipulate a box | Browse/manipulate jobs in a box | Browse/manipulate a box | Browse/manipulate jobs in a box | Browse Information | (network setting and default values) |
| Public user | ○ | ○ | x | x | ○ | x |
| General user | ○ | ○ | □ (only for the own box) | □ (only for the own box) | ○ | x |
| Box administrator | ○ | ○ | ○ | ○ | ○ | x |
| System administrator | ○ | ○ | ○ | □ (only for the own box) | ○ | ○ |

Referring to Table 1, "browse/manipulating a box" for the public box and for a private box means the browsing and manipulation of a box itself (such as deletion of a box and creation of a box), as shown in FIGS. 6 to 9. On the other hand, as shown in FIG. 10, "browse/manipulating jobs stored in a box" in the public box or in a private box means browsing jobs stored in a box and the manipulation of jobs. In this case, browsing represents a display of a job list as shown in FIG. 10, but it may represent selection of a job for a preview display, and manipulation may represent not only the creation and deletion of jobs but also an execution such as printing or transmission of a job. "Device setting" means network setting such as IP address setting for an MFP. In addition, in the embodiment, the "device setting" includes the setting of various default values of the MFP such as the modes to be set when the power is applied and the destination setting such as the registration and modification of a destination. Alternatively, the latter setting may be performed by a user other than the system administrator.

According to the embodiment, the system administrator can browse/manipulate other persons' private boxes themselves, but cannot browse/manipulate jobs stored in other persons' private boxes. Alternatively, it may be set so that the system administrator cannot browse/manipulate other persons' private boxes themselves.

As shown in Table 1, the device access authority varies with the users. When a user accesses an MFP, firstly user authentication is performed. Thus, the MFP can determine whether the user is a public user, a general user, a box administrator or a system administrator. Then the MFP limits the contents to be accessed according to the authority of the authenticated user. Various operations for the MFP are performed by means of the operation panel 24 of the MFP, or by a screen of a computer when the MFP is remote-accessed from the user's computer, and the MFP accepts only processings which accord to the user's authority when the user instructs various processings in the operation panel or in the screen.

It is to be noted that the contents displayed on the operation panel 24 or the screen of a computer vary with the access authority of an authenticated user. For example, as to the device setting, when the authenticated user is the system administrator, the contents which allow the device setting are displayed, while when the authenticated user is not the system administrator, the contents which inhibits the device setting are displayed. Regarding the browsing/manipulation of a box, the displayed contents are arranged so that only the box belonging to the authenticated user among the plurality of boxes can be browsed and manipulated. Consequently, by displaying the contents in correspondence to the access authority on the operation panel 24 or the computer screen, only the instructions corresponding to the user's access authority can be accepted, thus preventing any instruction exceeding the access authority from being issued.

By introducing a flexible management system which includes a box administrator in addition to a system administrator, as explained above, a user's request can be satisfied under various usage conditions. In addition, since the access authority can be segmented, the security in the system can be improved.

A remote access by using a web browser, a web server and the like has commonly been used as an interface for operating a network device, in addition to the operation panel 24 of the device. The remote access enables the device operation to be performed without the user moving to the device terminal, and it is therefore a useful interface for a general user and for the administrator who manages the device. If it is assumed that a user interface is provided for each access authority, the contents of the user interface must be carefully adjusted since the management system is complex and the access authority is segmented as shown in Table 1. Any system modification would lead to many changes in the user interfaces, thus requiring a time and a cost for the development of user interfaces. In an embodiment of the invention, a basic window (a web page) of the user interface is prepared to handle the various access authorities at the CGI module level. The basic window is designed so that all the processes can be handled when a user interface window is displayed for a user to access an MFP, the display contents is limited at the CGI module level according to the user's access authority. For example, if the user is not the system administrator, the items related to the device management cannot be set in the user interface. Specifically, only those items to which the user can access are displayed of the items prepared as the display contents in the basic window. In this way, the handling at the CGI module level can reduce the system modification level, thus leading to laborsaving for development and achieving cost reduction.

Figure 2:
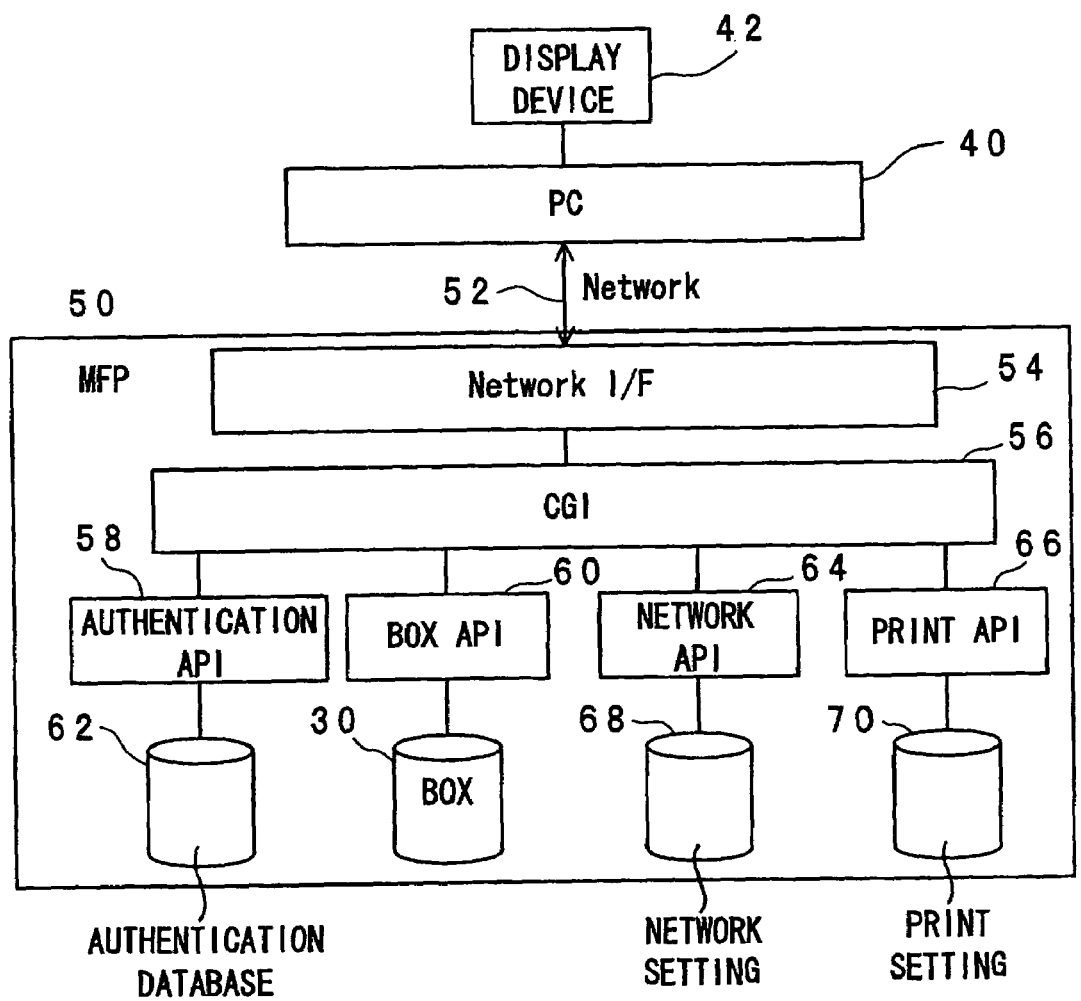
FIG. 2 is a functional block diagram on remote access from an external device.

FIG. 2 is a functional block diagram on the remote-access from an external device to an MFP 50 which operates as a network print device and the like. The interface controller 28 in the MFP 50 is connected via a network 52, such as Ethernet (registered trademark) to one or more computers (PC) 40 as examples of external devices. The MFP 50 operates as a printer, a copying machine or the like according to an instruction from the PC 40. The MFP 50 includes a web server; and a user of the PC 40 can have remote access with a web browser to the web server of the MFP 50 to display a web page on the screen of a display device 42.

In the MFP 50, a web access from a PC 40 is controlled by a network interface 54 in sending and receiving data. The network interface 54 corresponds to the above-mentioned web browser. The user of the PC 40 accesses the web browser to display a web page on the screen of the display device 42 of the PC. The web page is stored in a storage device (not shown). A data request for displaying the web page is directly sent to a data processing device 56. The data processing device 56 collects data from application program interfaces (APIs) 58, 60, 64 and 66, as required. In general, an API is a group of instructions and functions which can be used to develop a software for a platform (operating system and a middleware), and it also means a group of conventions defining a program procedure for using the instructions and functions. Each of the APIs 68, 60, 64 and 66 executes processes independently of each other. The authentication API 58 is used for user authentication. The box API 60 performs a basic process on the boxes 30. The network setting and print setting each performed by a user are processed through the network API 64 and the print API 66, respectively. The network API 64 and printing API 66 use network setting data 68 and print setting data 70, respectively. The data setting such as setting modification by a user is sent to the data processing device 56, which performs the setting modification by use of each of the 58, 60, 64 and 66. The data processing device 56 includes the programming language Perl and CGI programs executed by Perl, and the CGI programs sends and receives data to/from the browser. The instructions, functions, software etc. are provided in various embodiments as a computer-readable computer program product, such as a computer readable recording medium on which the instructions, functions, software etc. are recorded or stored.

The box API 60 executes a basic operation on the boxes 30 including an operation on a box 30 and an operation on jobs in a box 30. Also stored in the hard disk drive 20 is a box management database storing the box ID, box name, owner name and the like for each box, and the box job ID, job name, creation time and the like for each job accumulated in the box. An operation on a box includes display of a list of boxes, box creation, box deletion, modification of box attributes such as private/public and name. An operation on the jobs in the box 30 includes display of a list of box jobs, box job deletion, modification of box job attributes and the like.

In the MFP, security setting is employed. When the MFP is used, user authentication is performed. The authentication API 58 operates an authentication database 62. Stored in the authentication database 62 are user ID, password, and the like. The authentication API 58 handles the basic operation of classified authorities with respect to the device operation. In the user authentication, the above-mentioned four types, public user, general user, box administrator, system administrator, are identified, for example.

The remote access management is performed through the data processing device 56. As shown in Table 1, the access authority is divided into four classes, public user (Public), general user (User), box administrator (BoxAdmin), and system administrator (Admin). In a management system like this, for the purpose of implementing the remote management obtained by combining the above-mentioned authentication and the management of device, box and the like, it is useful to limit the menu display and box data at the user interface (UI) level. Specifically, the data processing device 56 limits contents displayed in a user interface (UI) in accordance with the authority of an authenticated user obtained from the user authentication. The limitation is based on the information received from the authentication API. In the example shown in Table 1, the display contents are limited with respect to the device setting, the browsing/manipulation of private boxes and the browsing/manipulation of jobs in private boxes. For example, when the authenticated user is the system administrator, the data processing device 56 generates a user interface window so that the device setting is allowed, whereas when the authenticated user is not the system administrator, the data processing device 56 generates a user interface window so that the device setting is prohibited. On the other hand, when the authenticated user is not the system administrator but the box administrator, the data processing device 56 generates a user interface window so that the boxes which other users can manipulate can be manipulated besides the box corresponding to the authenticated user can also be manipulated. In addition, for example, even when the authenticated user is the system administrator, a user interface window is generated so that the manipulation of files stored in a storage area corresponding to other users is prohibited. In this way, a user performs an operation such as browsing or manipulation by means of such a limited user interface window. Consequently, any process exceeding the user authority cannot be executed.

Examples of the limitation with the user interface will be explained below.

Figure 3:
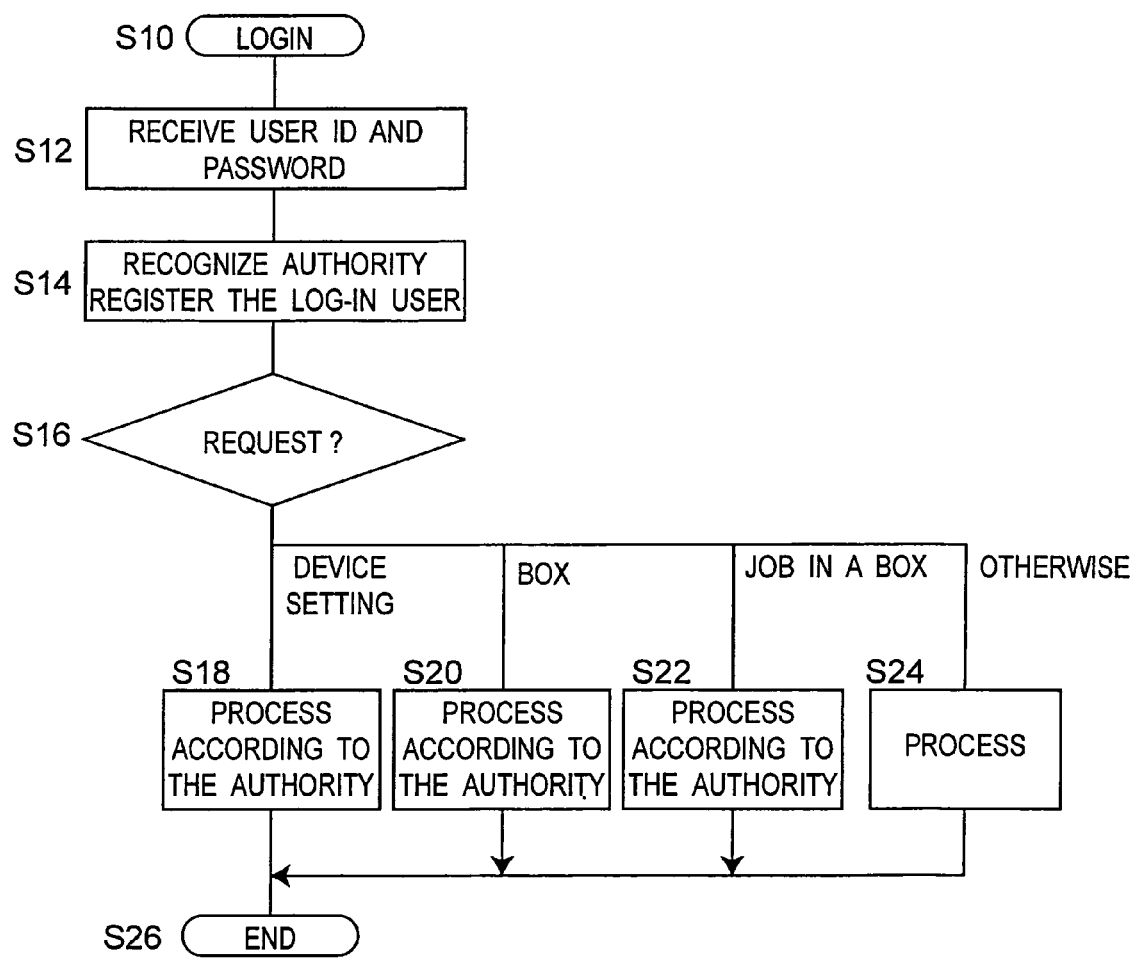
FIG. 3 is a flowchart of user authentication.

FIG. 3 shows a flowchart of the user authentication. When a remote access to the MFP is accepted (S10), the authentication by the authentication API 58 is performed in a user interface (UI) page provided for authentication to request a user name (user ID) and a password (S12). When the log-in user is accepted to use the MFP by inputting the user name and the password, the log-in of the user is recorded in a log file, and at the same time the user's authority is also registered (S14). That is, it is identified whether the log-in user is a public user, a general user, the box administrator or the system administrator, and the result is registered. Subsequently, a user interface page is displayed to accept the user's request. Then, the process branches according to the type of the user's request (S16). When the request relates to the device setting, the setting is processed according to the access authority of the user (S18). Here, a user interface page having the menu and the data limited according to the access authority is displayed to execute a process in response to the user's request. When the request relates to a box, a user interface page having the menu and the data limited according to the access authority is displayed to execute a process in response to the user's request (browsing/manipulation) (S20). When the request relates to jobs in a box, a user interface page having the menu and the data limited according to the access authority is displayed to execute a process in response to the user's request (browsing/manipulation) (S22). When the request relates to one of other processes, an user interface page according to the request is displayed to process the user's request (S24). Then, the process described above is finished (S26).

Figure 4:
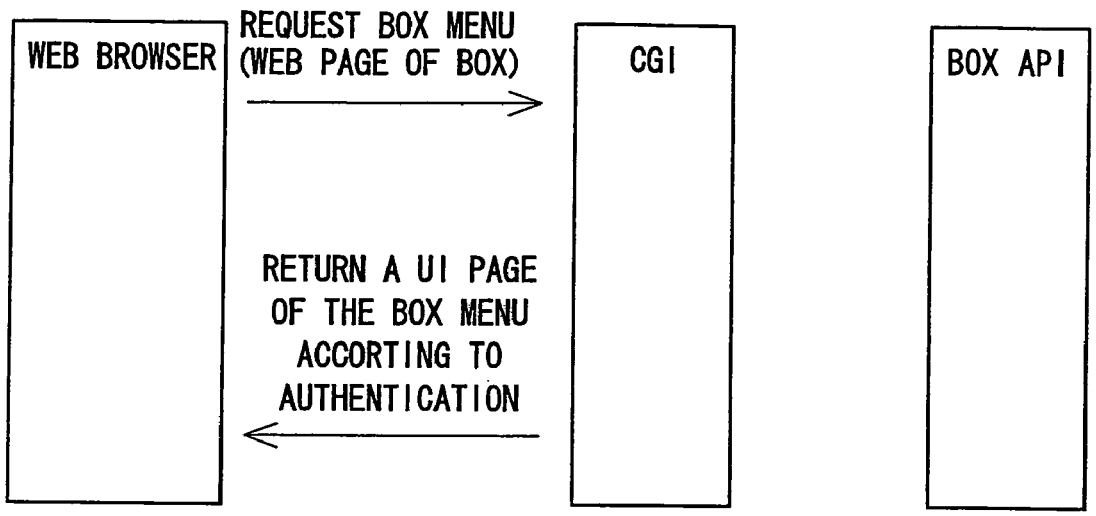
FIG. 4 is a diagram for explaining limitation in menu.

Next, the limitation in the menu displayed in the user interface (UI) is explained. As shown in FIG. 4, when a user of a PC 40 requests a box menu (a web page of box) of the MFP 50 from the web browser, the web server sends the request to the data processing device 56. Then, the data processing device 56 returns the UI page for the box menu according to the authentication result. In this case, the contents displayed in the user interface page are limited according to the user's authority. For example, the data processing device 56 typically returns a web page obtained by combining the UI for manipulating the box 30 and the UI for manipulating box jobs. However, the system administrator does not have the authority of manipulating box jobs with respect to the private boxes. Thus, for the system administrator, the data processing device 56 returns a web page without a part for manipulating private-box jobs.

Figure 5:
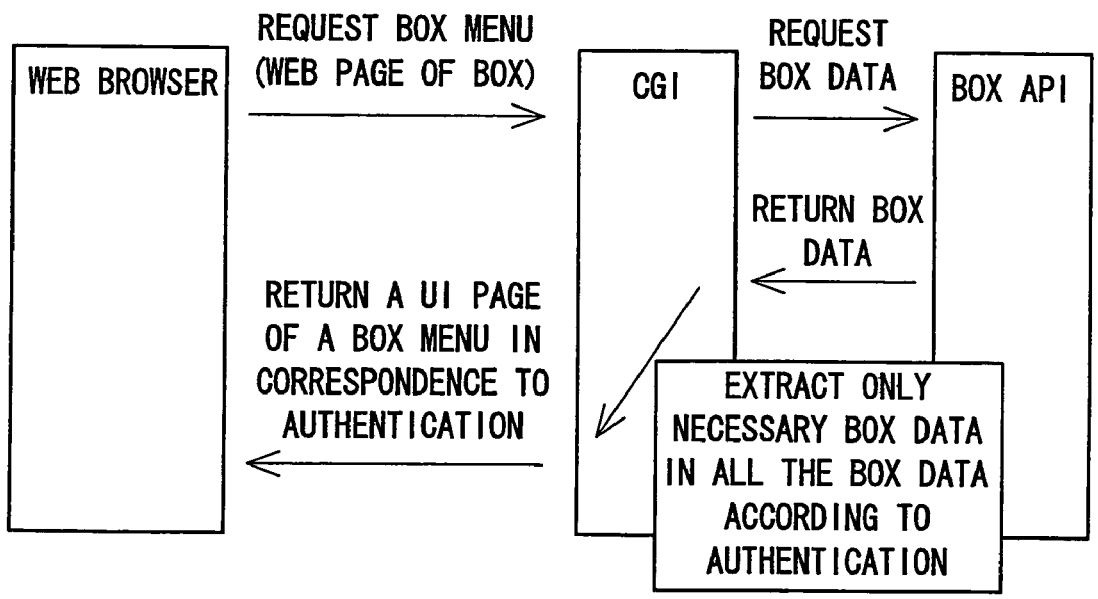
FIG. 5 is a diagram for explaining limitation in data.

Next, the limitation in the data to be displayed in the user interface is explained. As shown in FIG. 5, when the system administrator requests a box page (a web page for box information) of the MFP 50 from the web browser, the web server sends the request of the box page to the data processing device 56. Then, the data processing device 56 sends the box data request to the box API 60 and then receives a reply of the box data. The data processing device 56 extracts only necessary box data from all the box data according to the authentication result and returns the user interface page of box menu according to the authentication result.

For example, for a public user (Public), the data processing device 56 extracts only the public-box data from all the box data acquired from the box API 60 and returned the extracted data to the web browser. Similarly, for a general user (User), the data except the private-box data of the other general users is extracted and then returned to the web browser.

When a web page is displayed by the web browser, the data in HTML format is commonly displayed. As a feature of the HTML format, the data and the user interface (UI) structure are simultaneously implemented; so that the menu limitation and the data limitation can be simultaneously achieved. Alternatively, data in XML (data) and XSLT (UI structure) is also commonly employed to display data by the web browser. In this case, XML (data) and XSLT (UI structure) can be separately defined and thus the menu limitation and the data limitation are separately performed.

Figure 6:
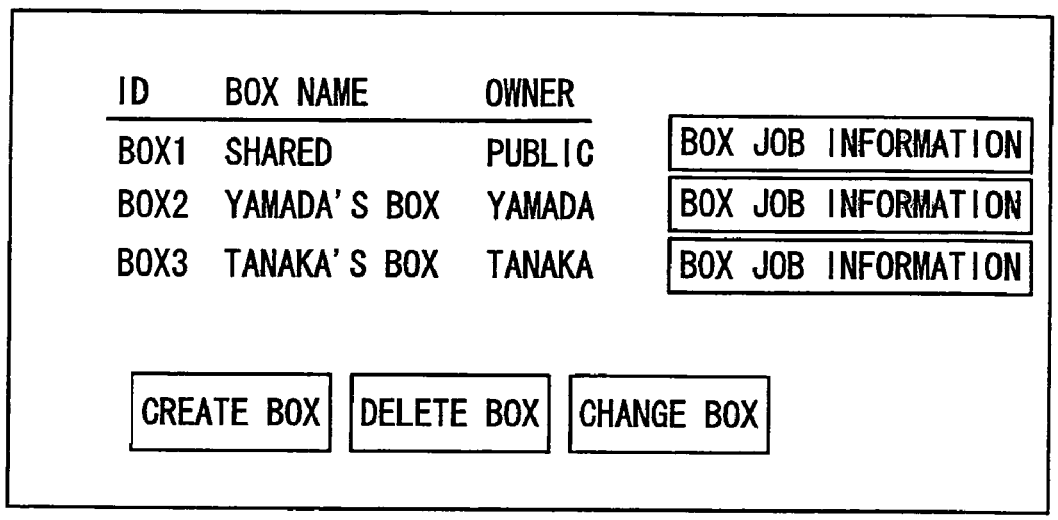
FIG. 6 is a user interface for a box administrator.

Next, exampled of user interface will be shown. FIG. 6 shows a user interface for the box administrator (BoxAdmin). The box administrator can perform the box manipulation and box job manipulation for all the boxes 30. In the user interface shown in FIG. 6 displaying a list of boxes, the ID, box name and owner data as well as a "box job information" button of the box for each box are displayed on all the boxes. In addition, a "create box" button, a "delete box" button and a "change box" button are displayed in the lower par in the user interface.

Figure 7:
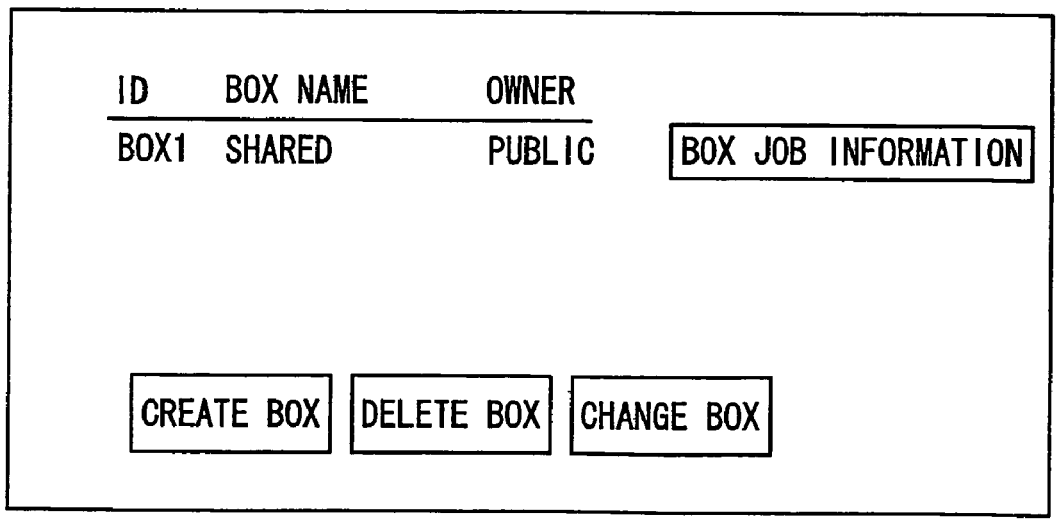
FIG. 7 is a user interface for a public user.

FIG. 7 shows a user interface displayed when the user is a public user (Public). A public user can access only the public box. Thus, no general user box is displayed in the user interface in contrast to FIG. 6.

FIG. 8 shows a user interface displayed when the user is a general user (User). The general user can access public boxes and his or her own private box. FIG. 8 shows a case where the general user is Yamada (User=Yamada). The public box and a box owned by Yamada are displayed.

FIG. 9 shows a user interface displayed when the user is a system administrator (Admin). The system administrator can access all the boxes 30, but does not have the authority of accessing box jobs. Thus, in contrast to FIG. 6, no item for accessing box job information (in this case, a button for accessing the job information) is displayed in the user interface. The system administrator is also a general user. Therefore, if there exists a private box owned by the system administrator, items for a user interface for accessing jobs in the box is displayed.

As described above, when a box job information button is pressed in the user interface or the window shown in FIG. 9 displaying a list of boxes according to the authority, another window showing the details of the box is displayed as shown in FIG. 10. In the window, box ID and box name are displayed at the top. In addition, the data of job ID, job name and creation time, and a "job deletion" button are displayed for each file in the box. In this case, when the "job delete" button is pressed, the job corresponding to the button is deleted from the box. In this window, only the "job deletion" button is described. It will easily be appreciated, however, that the buttons for executing a job, modifying the job setting (modifying the printing condition), sending a document file (image data of the job) and displaying a preview may be provided so that when each button is pressed, a process (manipulation) corresponding to the selection is performed. In FIGS. 6 to 9, a "box job information" button is provided for each displayed box. In FIG. 10, a "delete job" button is provided for each job. Alternatively, only a single button for job deletion is provided so that after a box or a job is selected, the button is pressed.

Figure 11:
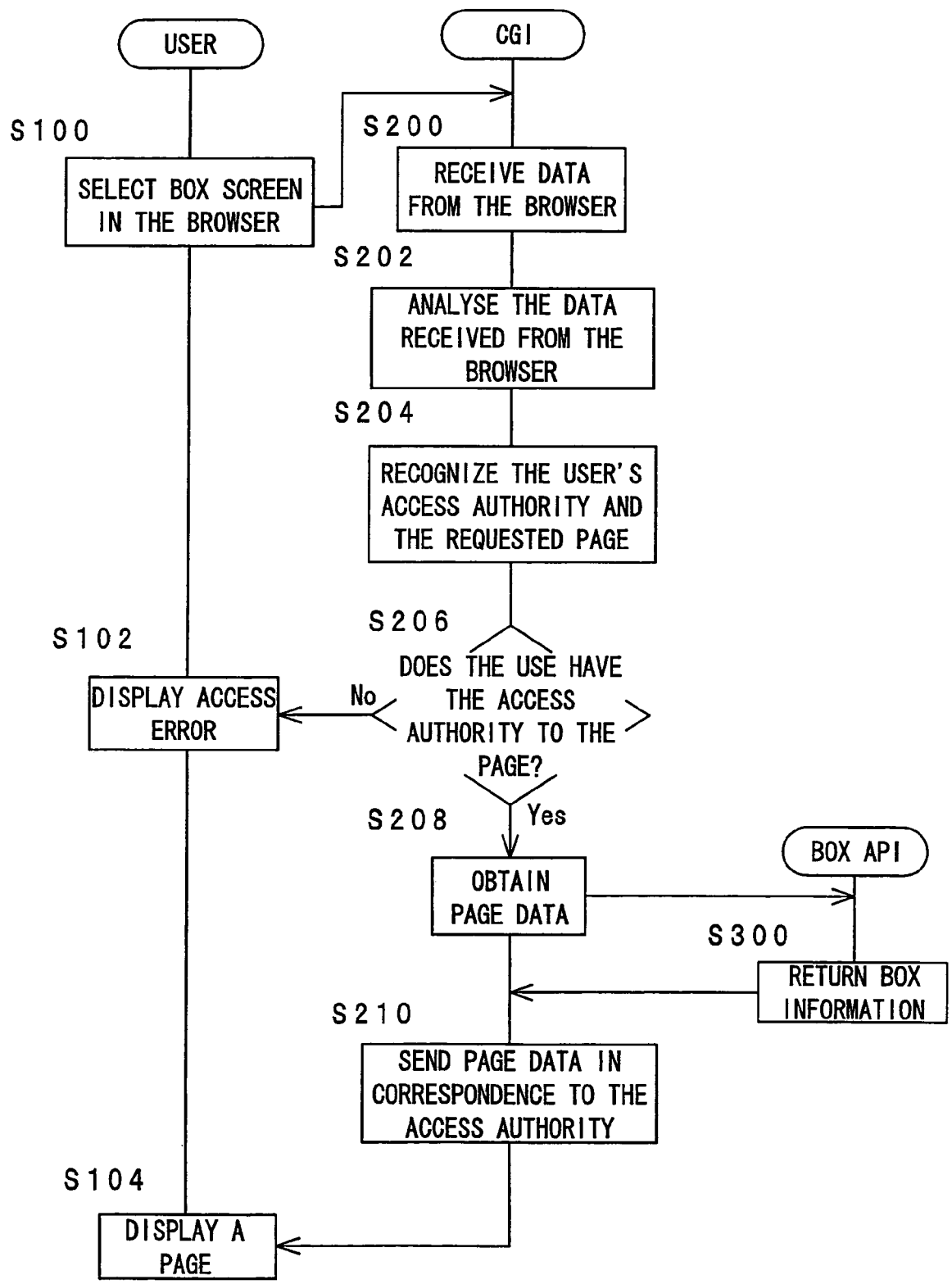
FIG. 11 is a flowchart of an operation of a data processing device.

FIG. 11 shows a flow of the operation of the data processing device 56. When a user selects a box window with the browser (S100), the CGI program is activated. The data is received from the browser and then the received data is analyzed (S202), and the access authority of the user and the requested page are recognized (S204). Next, it is decided whether the user has the authority of accessing the page (S206). If decided not (NO in S206), then an access error is displayed in the browser (S102). On the other hand, if decided so, the page data is acquired (S208). When a request for the box information is sent to the box API, the box API returns the box information (S300). When the box information is received, the page data is created according to the access authority and sent to the browser (S210), and the page is displayed (S104) in the browser.

As described above, since the limitation at the user interface level is performed by the data processing device 56 interposed between the user interface and the internal management database, network load can be reduced without sending unnecessary data through the network. In addition, since the data is not sent to unauthorized users, the security in the system can be provided. Furthermore, the customization in the user interface can be facilitated. Then, even when the management system is complex, it is not necessary to handle the system with low-level APIs such as box API 58 and authentication API 60. Consequently, the consistency of basic platform API can be maintained.

In prior art box management, the system administrator manages files stored in boxes maintained by general users. Accordingly, the security in the system may not be ensured. Then, alternatively, according to another embodiment of the invention, the system administrator can not manipulate files stored in private boxes created for the other users. Further, a box administrator may be provided. This embodiment is similar to the above-mentioned embodiment for the other points.

As explained above, even if the management system becomes complex, the increasing complexity can be handled within the device by customizing, at the user interface level, various limiting means interposed between the user interface and the management data such as storage area (box) and access authority. Furthermore, when the customization is performed by limiting the display contents in the user interface, the system modification level can be reduced, leading to laborsaving in development as well as cost reduction.

A control program can be provided as a computer-readable computer program product, such as, e.g., a computer-readable recording medium on which the control program is recorded or stored. The control program can also be implemented in an application specific integrated circuit (ASIC). The computer-readable recording medium can be, e.g., a CD-ROM, a DVD, a solid-state memory, a computer hard drive, RAM, or other types of memories that are readily removable or intended to remain fixed within the computer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A device comprising:
   a storage device storing files in each of a plurality of storage areas;
   a browsing device browsing and manipulating the files stored in the storage areas in said storage device;
   an authentication device authenticating a first user of the device;
   a setter setting the device settings;
   a first limiting device allowing the first user to set the device with the setter when the first user is authenticated as a system administrator by said authentication device, and inhibiting the first user to set the device by said setter when the first user is not authenticated as the system administrator; and
   a second limiting device allowing the first user authenticated by said authentication device to browse and to manipulate a storage area provided for the first user in the plurality of storage areas in said storage device with said browsing device, wherein when the first user authenticated by the authentication device is a box administrator different from a system administrator, said second limitation device allows the first user to browse and to manipulate another storage area provided for a second user authenticated by said authentication device and different from the box administrator in said storage device, and wherein even when the first user authenticated by the authentication device is the system administrator, the second limiting device prohibits browsing and manipulating of files stored in the another storage area provided for the second user authenticated by said authentication device and different from the system administrator.

2. The device according to claim 1, wherein the device is connected via a network to a terminal, and said first limiting device creates data displayed on the device settings according to a result of the authentication by said authentication device, and sends the created data to the terminal.

3. The device according to claim 2, wherein said first limiting device limits a menu and data displayed on the device settings according to the result of authentication and sends the limited menu and data to the terminal.

4. The device according to claim 1, wherein the device is connected via a network to a terminal, and said second limiting device creates data displayed on the storage areas according to a result of the authentication by said authentication device, and sends the created data to the terminal.

5. The device according to claim 4, wherein said second limiting device limits a menu and data displayed on the storage areas according to the result of the authentication by said authentication device and sends the limited menu and data to the terminal.

6. The device according to claim 1, wherein even when the first user authenticated by the authentication device is the system administrator, the second limiting device prohibits browsing and manipulation of the another storage area provided for the second user authenticated by said authentication device and different from the system administrator.

7. A device management method for a device comprising a storage device storing files in each of a plurality of storage areas, and a browsing device browsing and manipulating the files stored in the storage areas in the storage device, the method comprising:

authenticating a first user of the device;

allowing the first user to set the device settings when the first user is authenticated as a system administrator, and inhibiting the first user to set the device when the first user is not authenticated as the system administrator;

allowing the first user to browse and to manipulate a storage area provided for the first user in the plurality of storage areas in the storage device; and allowing the first user to browse and to manipulate another storage area when the first user is a box administrator different from a system administrator, the another storage area being provided in said storage device for a second user authenticated and different from the box administrator, wherein even when the first user authenticated is the system administrator, browsing and manipulating of files stored in the another storage area provided for the second user different from the system administrator is prohibited.

8. The device management method according to claim 7, wherein the device is connected via a network to a terminal, and data displayed on the device settings is created according to a result of the authentication, and the created data is sent to the terminal.

9. The device management method according to claim 8, wherein a menu and data displayed on the storage areas are limited according to the result of the authentication and the limited menu and data are sent to the terminal.

10. The device management method according to claim 7, wherein the device is connected via a network to a terminal, and data displayed on the storage areas is created according to a result of the authentication, and the created data is sent to the terminal.

11. The device management method according to claim 10, wherein a menu and data displayed on the storage areas are limited according to the result of the authentication and the limited menu and data are sent to the terminal.

12. A computer readable recording medium storing computer program instructions for device management for a device comprising a storage device storing files in each of a plurality of storage areas, and a browsing device browsing and manipulating the files stored in the storage areas in the storage device, which when executed by a computer programmed with the instructions causes the computer to perform the following steps:

authenticating a first user of the device;

allowing the first user to set the device settings when the first user is authenticated as a system administrator, and inhibiting the first user to set the device settings when the first user is not authenticated as the system administrator;

allowing the first user to browse and to manipulate a storage area provided for the first user in the plurality of storage areas in the storage device; and allowing the first user to browse and to manipulate another storage area when the first user is a box administrator different from a system administrator, the another storage area being provided in said storage device for a second user authenticated and different from the box administrator, wherein even when the first user authenticated is the system administrator, browsing and manipulating of files stored in the another storage area provided for the second user different from the system administrator is prohibited.

* * * * *